United States Patent
Atmur et al.

(10) Patent No.: US 7,535,434 B2
(45) Date of Patent: May 19, 2009

(54) LIGHT EMISSION CONTROL FOR FORMING TWO-DIMENSIONAL AND THREE-DIMENSIONAL IMAGES

(75) Inventors: Robert J. Atmur, Whittier, CA (US); Jeffrey H. Hunt, Thousand Oaks, CA (US)

(73) Assignee: The Boeing Company, Chicago, IL (US)

(*) Notice: Subject to any disclaimer, the term of this patent is extended or adjusted under 35 U.S.C. 154(b) by 681 days.

(21) Appl. No.: 11/042,674

(22) Filed: Jan. 25, 2005

(65) Prior Publication Data

US 2006/0164331 A1    Jul. 27, 2006

(51) Int. Cl.
*G09G 3/00* (2006.01)
*G09G 3/34* (2006.01)
*G02F 1/295* (2006.01)

(52) U.S. Cl. ............... 345/30; 345/86; 385/1; 385/4; 385/6

(58) Field of Classification Search ........... 345/30–100; 385/1–30
See application file for complete search history.

(56) References Cited

U.S. PATENT DOCUMENTS

| | | | |
|---|---|---|---|
| 3,971,887 A | | 7/1976 | Lin et al. |
| 4,123,783 A | * | 10/1978 | Pearson et al. ............... 345/86 |
| 4,229,072 A | * | 10/1980 | Torok et al. ............... 359/282 |
| 4,497,545 A | | 2/1985 | Ross |
| 4,500,176 A | * | 2/1985 | MacNeal ............... 345/86 |
| 4,584,237 A | | 4/1986 | Pulliam |
| 5,473,466 A | | 12/1995 | Tanielian et al. |
| 6,243,193 B1 | | 6/2001 | Katsuragawa |
| 2003/0218724 A1 | | 11/2003 | Yatsu et al. |
| 2004/0100892 A1 | | 5/2004 | Horimai |
| 2005/0180672 A1 | * | 8/2005 | Ellwood ............... 385/1 |

* cited by examiner

*Primary Examiner*—David L Lewis
(74) *Attorney, Agent, or Firm*—Haynes and Boone, LLP

(57) ABSTRACT

Systems and methods are disclosed for providing a more robust flat panel display by using the Faraday effect to control light emission from a solid state material so as to form two-dimensional or three-dimensional images. Flux tubes can be configured to define a two dimensional array. Each flux tube is somewhat analogous to a single bubble of a magnetic bubble memory and can define a pixel. At least some aspect of light transmitted through a flux tube can be varied thereby, so as to facilitate the formation of an image.

18 Claims, 4 Drawing Sheets

LIGHT EMISSION CONTROL FOR FORMING TWO-DIMENSIONAL AND THREE-DIMENSIONAL IMAGES

TECHNICAL FIELD

The present invention relates generally to flat panel displays and holography. It relates more particularly to a solid state flat panel display that uses the Faraday effect to modify light for the production of two-dimensional or three-dimensional images.

BACKGROUND

Flat panel displays are well known. They are used as television screens, computer monitors, and the like. One example of a contemporary flat panel display is the common plasma television screen.

Contemporary flat panel displays tend to be popular because of their space saving configuration and appealing aesthetic design. However, such contemporary flat panel displays tend to suffer from undesirable degradation and consequent premature aging due to environmental effects (such as temperature extremes, bright sunlight, and high humidity). Such environmental effects can result in an undesirably high failure rate. For example, contemporary large plasma screens are often only about one half of their original brightness after five to six years of use.

Holograms are also well known. Holograms are three-dimensional images that can be used for entertainment, medical imaging, and a variety of other purposes. Static holograms are stored as interference patterns on film. Moving holograms, such as may be used to provide three-dimensional movies, require the use of a rapidly programmable phase plate to reproduce the images.

Thus, there is a need for a solid-state flat panel display that is mechanically robust, consumes little or no power when in a standby mode, and is long-lived in the presence of a harsh environment. The need for such an improved flat panel display is more urgent for larger size monitors and televisions, which are inherently more costly and can tend to be more subject to undesirable environmental degradation. There is also a need for a rapidly programmable phase plate that is suitable for reproducing holographic images.

SUMMARY

Systems and methods are disclosed herein to provide a more robust flat panel display. For example, in accordance with an embodiment of the present invention, the Faraday effect is used to control light emission from a solid state material.

More specifically, in accordance with one embodiment of the present invention, a plurality of flux tubes are configured to define a two dimensional array. Each flux tube is somewhat analogous to a single bubble of a magnetic bubble memory. At least some aspect of light transmitted through a flux tube can be varied thereby so as to facilitate the formation of an image.

In accordance with another embodiment of the present invention, the flux tubes are formed of garnet and are controlled by applying a magnetic field thereto. The Faraday effect causes a polarization plane of light transmitted through a flux tube to rotate. The flux tubes cooperate with other optical elements to define pixels that are either lit or unlit, depending upon whether the polarization planes of light transmitted through the flux tubes have been rotated or not.

In accordance with another embodiment of the present invention, the flux tubes define an array that is suitable for reproducing holographic images.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

One embodiment of the present invention takes advantage of the Faraday effect in garnet materials to reproduce two-dimensional or three-dimensional images. This effect has previously been used in magnetic bubble memory devices. It was first described in 1845 by Michel Faraday. This effect actually takes place in many optically transparent dielectric materials and other such materials may be utilized according to the present invention. When such materials are exposed to a magnetic field, they tend to rotate the plane of light polarization about the axis of the magnetic field.

Figure 1:
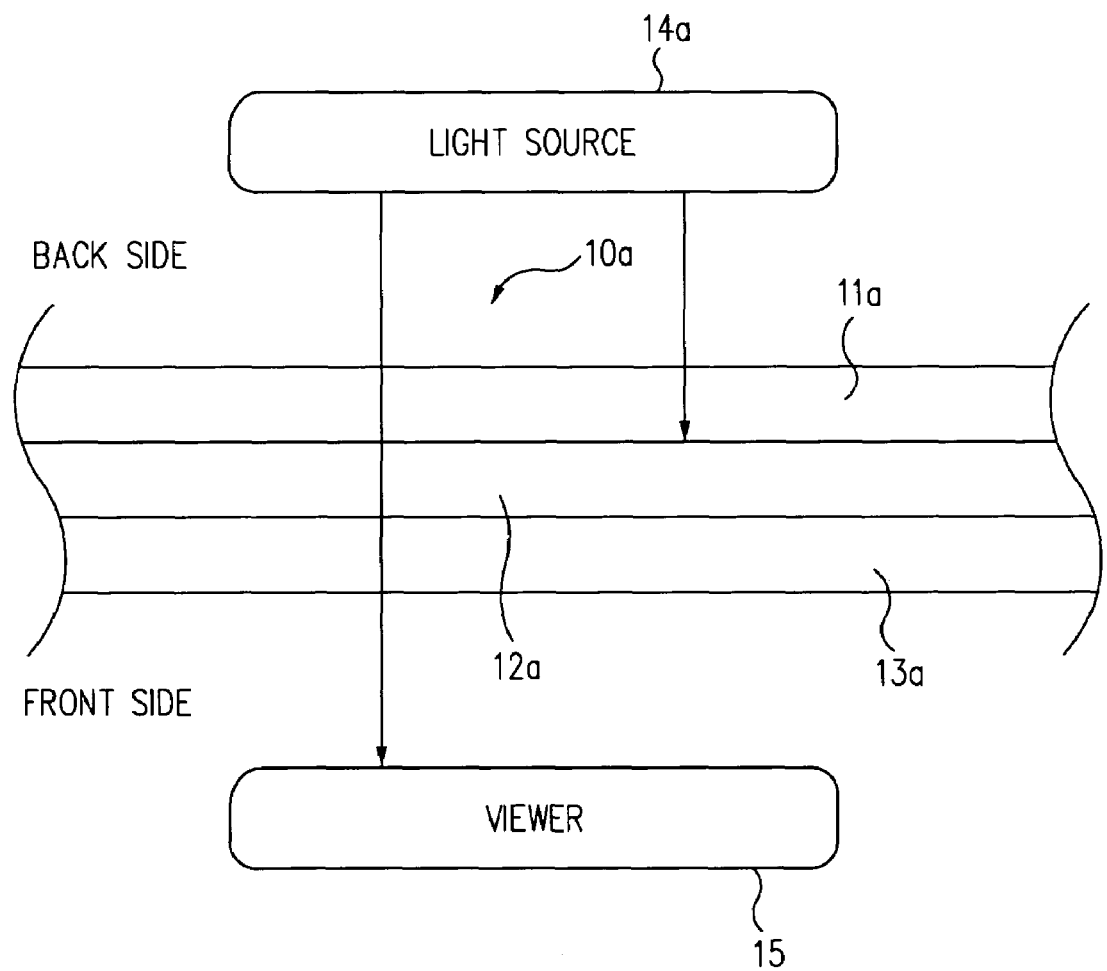
FIG. 1 shows a semi-schematic, fragmentary, cross-sectional view taken along line 1 of FIG. 4 or 5, illustrating the layers of a flat panel display in accordance with an exemplary transmission mode embodiment of the present invention.
Figure 4:
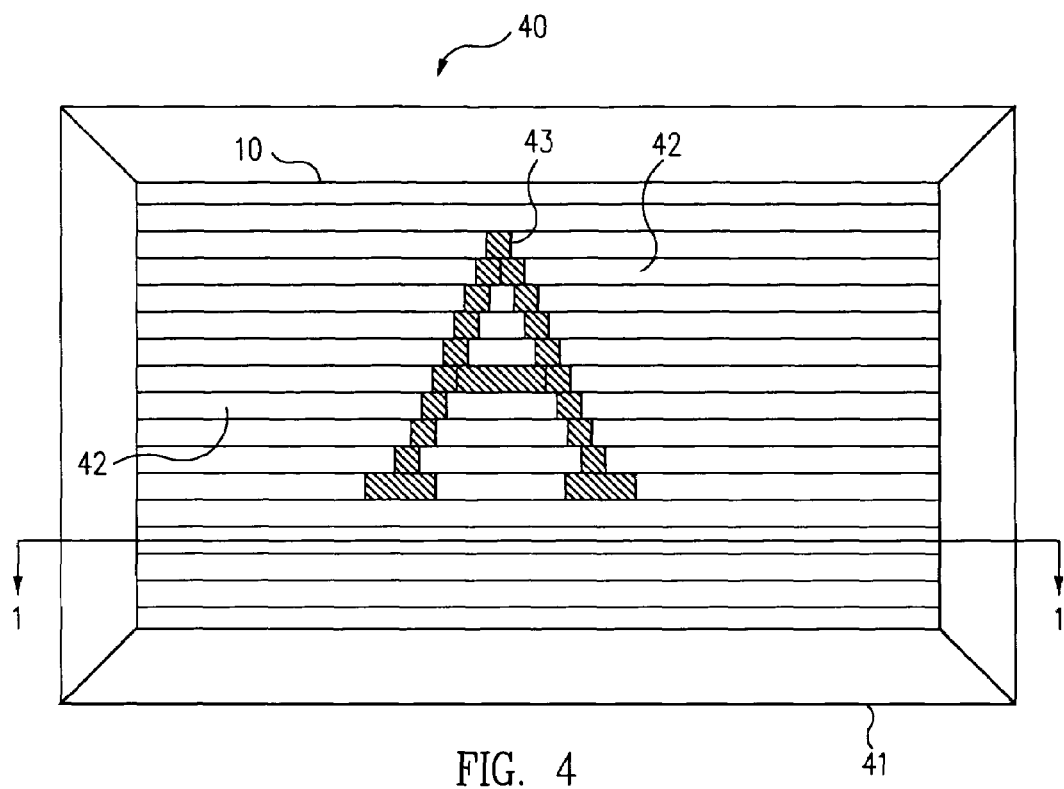
FIG. 4 shows a front view of a flat panel display (an array of flux tubes) that is suitable for producing two-dimensional images, according to either the transmission mode embodiment of FIG. 1 or the reflection mode embodiment of FIG. 2.
Figure 5:
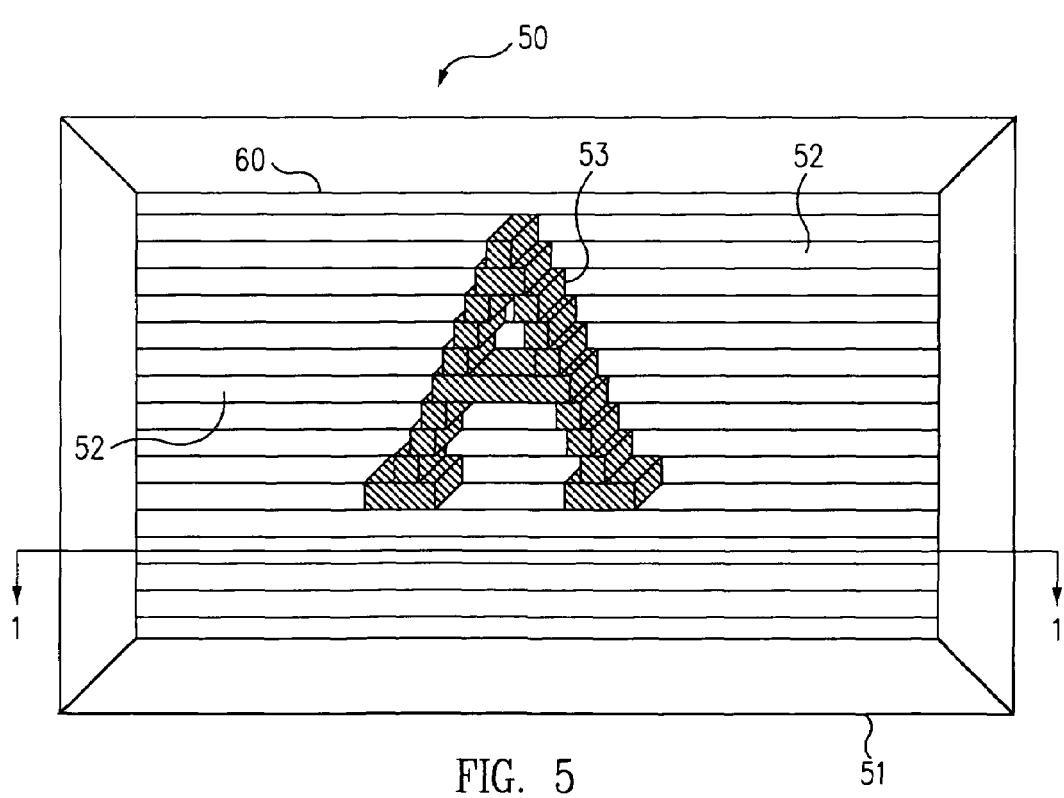
FIG. 5 shows a front view of an array of flux tubes that is suitable for producing three-dimensional (holographic) images, according to either the transmission mode embodiment of FIG. 1 or the reflection mode embodiment of FIG. 2.

FIG. 1 shows a cross-sectional view illustrating the layers of a flat panel display 10a (such as the flat plane display shown in FIGS. 4 and 5). That is, FIG. 1 shows a portion of the layers of a cross-section taken about line 1 of FIG. 4 or FIG. 5.

The present invention can be practiced in either a transmission mode or a reflection mode. FIG. 1 shows the construction of the present invention in a transmission mode. In the transmission mode, a light source 14a is on one side of flat panel display 10a, i.e., the back side, and a viewer 15 is on the other side, i.e., the front side, of the flat panel display 10a. Viewer 15 is typically a person, but can alternatively be a device, such as a camera or other optical system.

Flat panel display 10a can comprise a plurality of layers. For example, flat panel display 10a can comprise rear optical materials layer 11a, polarization control layer 12a, and forward optical materials layer 13a.

According to the transmission mode flat panel display shown in FIG. 1, rear optical materials layer 11a can comprise a transparent protective layer, lenses, polarization filters, diffusers, polarization rotators, and other optical elements as necessary to direct light, such as polarized light, from light source 14a to polarization control layer 12a.

Polarization control layer 12a modifies the light from light source 14a, so as to either permit transmission thereof to viewer 15 or to inhibit transmission thereof to viewer 15. Generally, polarization control layer 12a affects the polarization of light transmitted thereto from rear optical material layer 11a such that the light is either transmitted from flat panel display 10a to define a lit pixel or is not transmitted from flat panel display 10a to define a dark or unlit pixel, as described in detail below.

Forward optical materials layer 13a can comprise a transparent protective layer, lenses, polarization filters, diffusers, polarization rotators, and other optical elements as necessary to selectively direct light, such as polarized light, from polarization control layer 12a to viewer 15. Forward optical materials layer 13a can cooperate with polarization control layer 12a to selectively determine which pixels are lit and which pixel are unlit.

More particularly, rear optical materials layer 11a can comprise a polarization filter, such that light provided to polarization control layer 12a is substantially polarized. Forward optical materials layer 13a can comprise another polarization filter. The orientation of the polarization filter of forward optical materials layer 13a can be such that light transmitted through the polarization filter of rear optical material layer 11a is also transmitted through forward optical material layer 13a. That is, the optical axes of both polarization filters can be aligned.

Thus, if the polarization angle of light from the rear optical materials layer 11a is not substantially altered by polarization control layer 12a, then that light can be transmitted through forward optical materials layer 13a and can thus define one or more lit pixels to viewer 15. However, if the polarization angle of light from the rear optical materials layer 11a is substantially altered by polarization control layer 12a, then that light can be blocked by forward optical materials layer 13a and can thus define one or more unlit pixels to viewer 15.

Alternatively, the polarization filter of forward optical materials layer 13a can be oriented such that light rotated by polarization control layer 12a is transmitted therethrough and light not rotated by polarization control layer 12a is not transmitted therethrough.

In this manner, polarization control assembly 12a can either affect, e.g., rotate, the polarization of light transmitted therethrough or can not affect, e.g., not rotate, such light. The rotation or non-rotation of light transmitted through polarization control layer 12a can be controllable on a pixel level, such that lit and unlit pixels of flat panel display 10a can be configured in a manner that defines a desired image.

Figure 2:
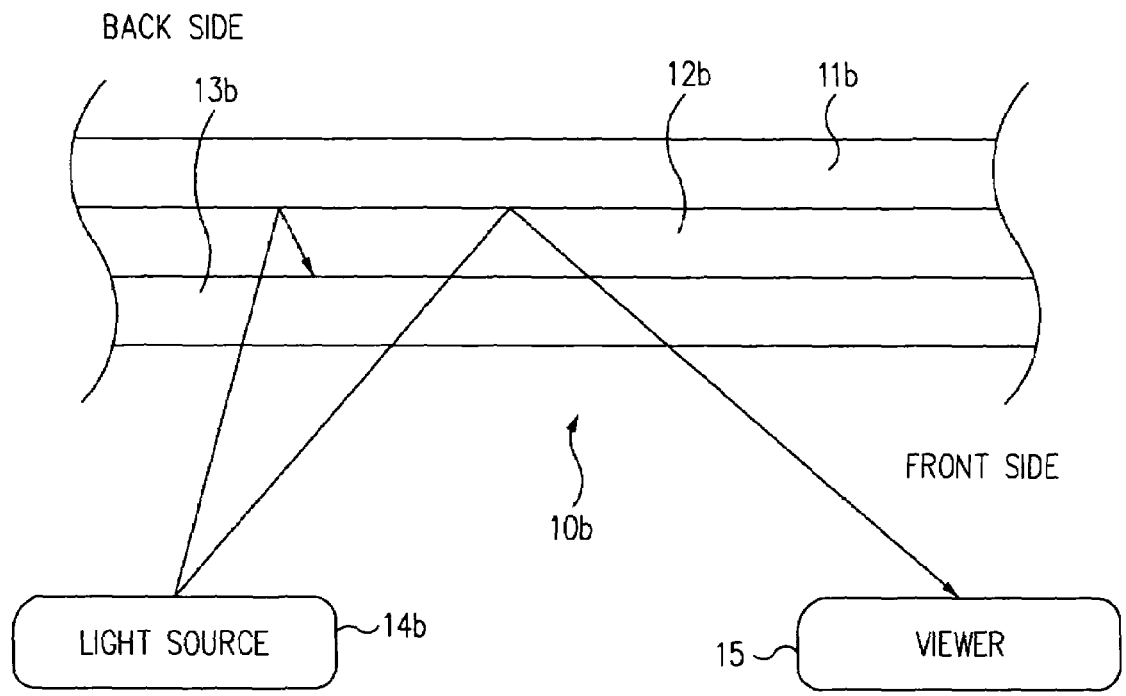
FIG. 2 shows a semi-schematic, fragmentary, cross-sectional view taken along line 1 of FIG. 4 or 5, illustrating the layers of a flat panel display in accordance with an exemplary reflection mode embodiment of the present invention.

FIG. 2 shows a cross-sectional view illustrating the layers of a flat panel display 10b in accordance with an exemplary reflection mode embodiment of the present invention. Like FIG. 1, FIG. 2 shows a portion of the layers of a cross-section taken about line 1 of FIG. 4 or 5. In the reflection mode, a light source 14b is on the same side of flat panel display 10b, i.e., the front side, as viewer 15.

It is worthwhile to point out that like reference numerals from one figure identify like elements in another figure and that different letter suffixes of like reference numerals indicate that there is some commonality between the elements and that there may also be some difference. For example, flat panel display 10a of FIG. 1 and flat panel display 10b of FIG. 2 are both flat panel displays. However, they can be structurally and functionally different since flat panel display 10a is a transmission mode flat panel display and flat panel display 10b is a reflection mode flat panel display. When such numerals are used without a letter suffix, then the element reference is generic with respect to the suffixed elements. Thus, flat panel display 10 of FIG. 4 can be either a transmission mode flat panel display 10a or a reflection mode flat panel display 10b.

Flat panel display 10b can comprise a plurality of layers. For example, flat panel display 10b can comprise rear optical materials layer 11b, polarization control layer 12b, and forward optical materials layer 13b.

According to the transmission mode flat panel display shown in FIG. 2, rear optical materials layer 11b can comprise a protective layer, a reflector, lenses, polarization filters, diffusers, polarization rotators, and other optical elements as necessary to direct light, such as polarized light, from light source 14b to polarization control layer 12b.

Again, polarization control layer 12b modifies the light from light source 14b, so as to either permit transmission thereof to viewer 15 or to inhibit transmission thereof to viewer 15. Generally, polarization control layer 12b affects the polarization of light transmitted thereto from rear optical material layer 11b such that the light is either transmitted from flat panel display 10b to define a lit pixel or is not transmitted from flat panel display 10b to define a dark or unlit pixel, as described in detail below.

Forward optical materials layer 13b can comprise a transparent protective layer, lenses, polarization filters, diffusers, polarization rotators, and other optical elements as necessary to selectively direct light, such as polarized light, from polarization control layer 12b to viewer 15. Forward optical materials layer 13b can cooperate with polarization control layer 12b to selectively determine which pixels are lit and which pixel are unlit.

For example, rear optical materials layer 11b can comprise a polarization filter and a reflector, such that light provided to polarization control layer 12b is substantially polarized. Forward optical materials layer 13b can comprise another polarization filter. The orientation of the polarization filter of forward optical materials layer 13b can be such that light transmitted through the polarization filter of rear optical material layer 11b is also transmitted through forward optical material layer 13b. That is, the optical axes of both polarization filter can effectively be aligned.

Thus, if the polarization angle of light from rear optical materials layer 11b is not substantially altered by polarization control layer 12b, then that light can be transmitted through forward optical materials layer 13b and can thus define one or more lit pixels to viewer 15. However, if the polarization angle of light from the rear optical materials layer 11b is substantially altered by polarization control layer 12b, then that light can be blocked by forward optical materials layer 13b and can thus define one or more unlit pixels to viewer 15.

In this manner, polarization control layer 12b can either affect, e.g., rotate, the polarization of light transmitted therethrough or can not affect, e.g., not rotate, such light. The rotation or non-rotation of light transmitted through polarization control layer 12b can controllable on a pixel level, such that lit and unlit pixels of flat panel display 10b can be configured in a manner that defines a desired image.

Figure 3:
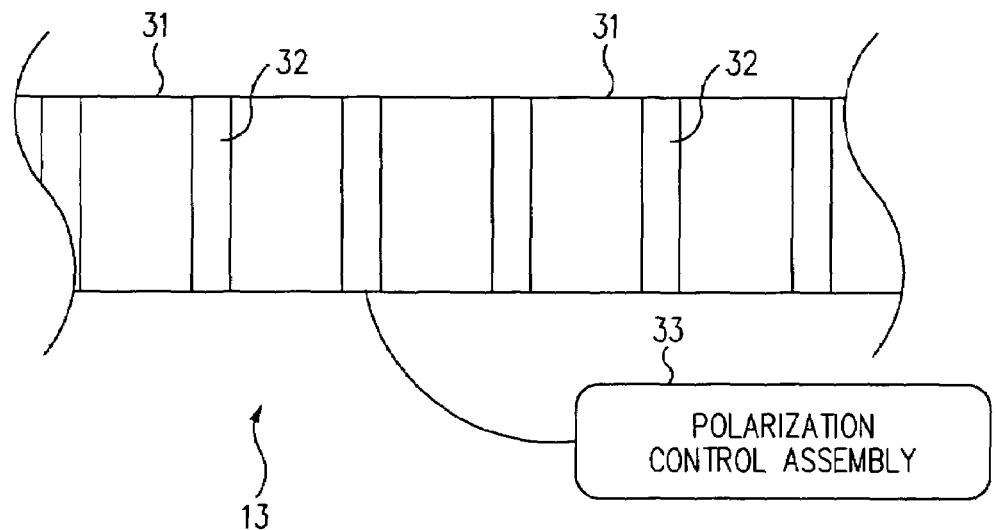
FIG. 3 shows an enlarged, semi-schematic, fragmentary, cross-sectional view of an exemplary polarization control layer according to either the transmission mode embodiment of FIG. 1 or the reflection mode embodiment of FIG. 2.

FIG. 3 shows an enlarged, cross-sectional view of an exemplary polarization control layer 13 according to either the embodiment of FIG. 1 or the embodiment of FIG. 2. Polarization control layer 13 comprises a plurality of flux tubes 31 separated by control slots 32. Each flux tube 31 can define a pixel or a group of pixels. Further, a group of flux tubes 31 can define a pixel.

Filters can be configured to define pixels of different colors. For example, red, green, and blue filters can be used to provide color images according to well known principles.

Flux tubes 31 of flat panel display 13 correspond to the magnetic bubbles of a magnetic bubble memory device. The alternating flux tubes 31 and control slots 32 correspond to a string of magnetic bubbles. A plurality of such strings, disposed in a side-by-side or parallel, generally planar configuration, defines a two dimensional array of flux tubes 31 which defines a two dimensional array of pixels that can be used to provide an image.

According to one embodiment of the present invention, polarization control layer 13 can be fabricated by growing a sheet of garnet material. The garnet material can, for example, be suitable for use in bubble memory devices. The garnet material can be masked so as to provide elongated, generally parallel slots across the length of the garnet surface. That is, the slots can be etched or otherwise formed into a surface of a generally planar sheet of garnet material.

A magnetic and conductive material, such as SmCo or NdBFe, can be disposed within the slots. Thus, flux tubes 31 are defined by the garnet material between control slots 32. The magnetic and conductive material defines the control slots 32. Control slots 32 can be formed completely through the garnet or can alternatively be formed partially therethrough. Control slots 32 can support remaining garnet that defines flux tubes 31.

Elongated flux tubes 31 and elongated control slots 32 can have any desired cross-sectional configuration. For example, they can be round, oval square, rectangular, or any other regular or irregular shape.

A polarization control assembly 33 provides control signals to the control slots 32. The control signals determine which flux tubes 31 rotate the polarization of light and which flux tubes 31 do not rotate the polarization of light. Thus, the control signals likewise determine which pixels are lit and which pixels are unlit.

FIG. 4 shows a front view of a two-dimensional display device 40 that comprises a flat panel display 10 according to either the transmission mode embodiment of FIG. 1 or the reflection mode embodiment of FIG. 2. Flat panel display 10 comprises a plurality of rows 42 of alternating flux tubes 31 and control slots 32. Optionally, a frame or bezel 41 surrounds the flat panel display 10 and may provide structural support thereto.

Because of its low power consumption, the flat panel display of the present invention can be used to store images or other information, in addition to providing such material for display. Thus, at least one aspect of the present invention can function as a storage device.

One or more embodiments of the present invention provide a solid-state flat panel display that is mechanically robust, consumes little or no power when in a standby mode, and is long-lived in the present of a harsh environment. Large flat panel displays can be made according to the present invention and tend to be less subject to undesirable environmental degradation than their contemporary counterparts.

FIG. 5 shows a front view of a three-dimensional display device 50 that comprises an array of flux tubes 31. The flux tubes 31 are configured so as to provide a flat panel display 60 which is capable of reproducing a three-dimensional image. Again, flux tubes 31 alternate with control slots 32 to define rows 52 thereof. A bezel 51 can surround flat panel display 60.

In this instance, flux tubes 31 are sized (are sufficiently small) so as to be capable of mimicking (at least to some degree) holographic film in the way that they facilitate the interference of light. Polarization control layer 12a or 12b defines interference fringes that control the phase of light passing therethrough in a manner that produces a holographic image 53.

Polarization control assembly 33 controls flux tubes 31 so as to control the holographic images produced thereby. The state of flux tubes 31 can be rapidly varied, such that holographic motion pictures or the like can be provided. Thus, the array of flux tubes defines a rapidly programmable phase plate that can be used to provide three-dimensional images.

To provide a holographic effect, light source 14a or 14b can be a source of coherent light, such as one or more lasers. The rear and forward optical materials layers are configured to facilitate the diffraction of light by the polarization control layer 12a or 12b in a manner that facilitates the production of a hologram.

Figure 6:
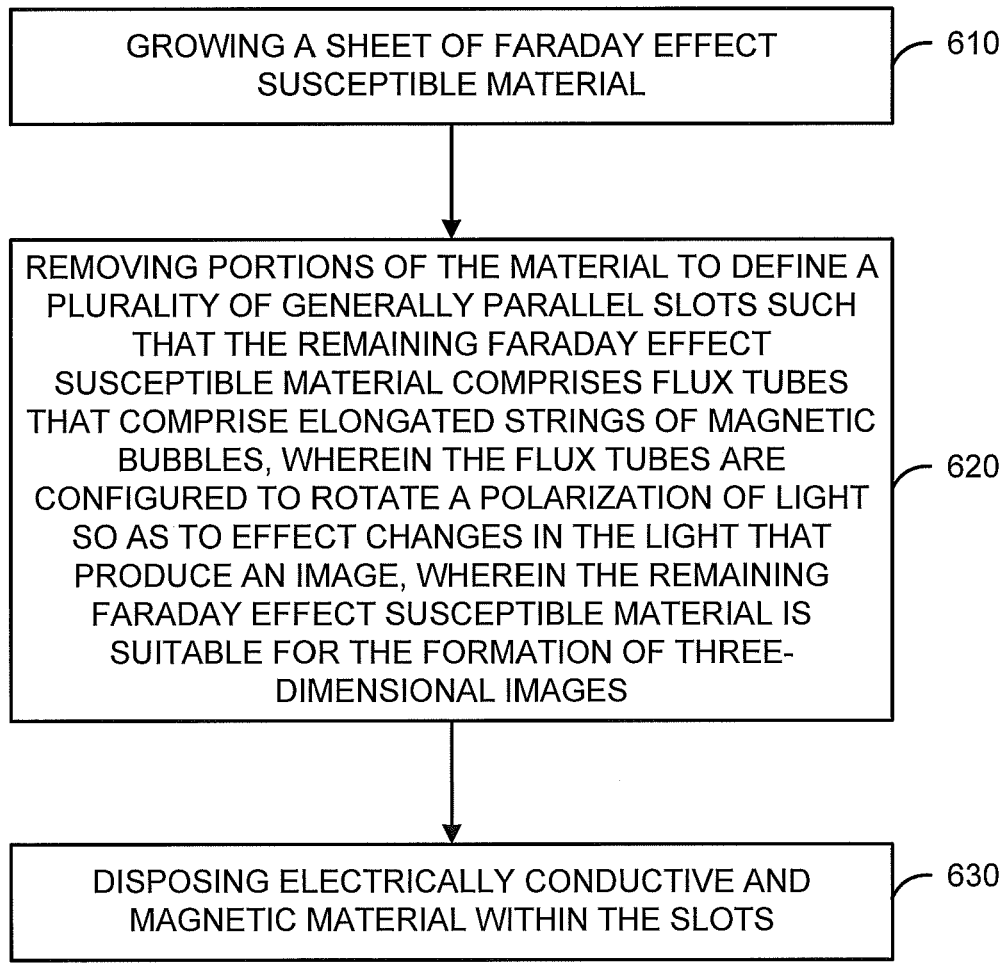
FIG. 6 shows a method for forming a flat panel display.

FIG. 6 shows a method for forming a flat panel display, the method comprising: growing a sheet of Faraday effect susceptible material (610); removing portions of the material to define a plurality of generally parallel slots such that the remaining Faraday effect susceptible material comprises flux tubes that define elongated strings of magnetic bubbles, wherein the remaining Faraday effect susceptible material is suitable for the formation of three-dimensional images (620); and disposing electrically conductive and magnetic material within the slots (630).

Embodiments described above illustrate but do not limit the invention. It should also be understood that numerous modifications and variations are possible in accordance with the principles of the present invention. Accordingly, the scope of the invention is defined only by the following claims.

We claim:

1. A flat panel display comprising:
a two dimensional array of flux tubes disposed in the panel and extended in a direction substantially normal to a front side and a back side of the panel, wherein the flux tubes are configured to rotate a polarization of light so as to effect changes in the light that produce an image; and
a plurality of control slots disposed in the panel between the flux tubes and substantially parallel to the flux tubes, wherein the control slots are adapted to receive control signals which determine which of the flux tubes rotate the polarization of the light, wherein the flux tubes and the control slots comprise elongated strings of magnetic bubbles.

2. The flat panel display of claim 1, wherein the two dimensional array comprise a plurality of linear arrays of flux tubes.

3. The flat panel display of claim 1, wherein the two dimensional array is generally planar.

4. The flat panel display as recited in claim 1, wherein the polarization of light is rotated about a magnetic field axis.

5. The flat panel display as recited in claim 1, wherein the flux tubes comprise garnet.

6. The flat panel display as recited in claim 1, wherein the changes in the light are due to changes in a transmission characteristic along a path of the light.

7. The flat panel display as recited in claim 1, wherein the changes in the light are due to changes in reflection along a path of the light.

8. The flat panel display as recited in claim 1, wherein the flux tubes are configured to facilitate the production of three-dimensional images.

9. A method for controlling light emission using a flat panel display, the method comprising:

receiving a plurality of control signals at a plurality of control slots disposed in the panel between a plurality of flux tubes and substantially parallel to the flux tubes, wherein the control signals determine which of the flux tubes rotate a polarization of light; and rotating the polarization of light with the flux tubes in response to the control signals so as to effect changes in the light to produce an image, wherein the flux tubes are disposed in the panel and extended in a direction substantially normal to a front side and a back side of the panel, wherein the flux tubes and the control slots comprise elongated strings of magnetic bubbles.

10. The method of claim 9, wherein the light polarization is rotated about a magnetic field axis.

11. The method of claim 9, wherein the flux tubes comprise garnet.

12. The method of claim 9, wherein the changes in the light are due to changes in a transmission characteristic along a path of the light.

13. The method of claim 9, wherein the changes in the light are due to changes in reflection along a path of the light.

14. The method of claim 9, wherein the flux tubes are configured to facilitate the production of three-dimensional images.

15. A method for forming a flat panel display, the method comprising:

growing a sheet of Faraday effect susceptible material;

removing portions of the material to define a plurality of generally parallel slots such that the remaining Faraday effect susceptible material comprises flux tubes of a two dimensional array of flux tubes disposed in the panel and extended in a direction substantially normal to a front side and a back side of the panel, wherein the flux tubes are configured to rotate a polarization of light so as to effect changes in the light that produce an image; and disposing electrically conductive and magnetic material within the slots, wherein the electrically conductive and magnetic material provides a plurality of control slots disposed in the panel between the flux tubes and substantially parallel to the flux tubes, wherein the control slots are adapted to receive control signals which determine which of the flux tubes rotate the polarization of the light, wherein the flux tubes and the control slots comprise elongated strings of magnetic bubbles.

16. The method of claim 15, wherein the remaining Faraday effect susceptible material is suitable for the formation of three-dimensional images.

17. The method of claim 15, wherein the Faraday effect susceptible material comprises garnet.

18. The method of claim 15, wherein the electrically conductive and magnetic material comprises at least one of SmCo and NdBFe.

* * * * *